(12) United States Patent
Lee et al.

(10) Patent No.: US 7,403,254 B2
(45) Date of Patent: Jul. 22, 2008

(54) IN-PLANE SWITCHING LIQUID CRYSTAL DISPLAY DEVICE HAVING CIRCULAR ELECTRODE

(75) Inventors: Yun-Bok Lee, Seoul (KR); Sang-Min Jang, Gyeonggi-Do (KR); Youn-Gyoung Chang, Gyeonggi-Do (KR); Won-Ho Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 324 days.

(21) Appl. No.: 11/139,666

(22) Filed: May 31, 2005
(Under 37 CFR 1.47)

(65) Prior Publication Data
US 2006/0001812 A1    Jan. 5, 2006

(30) Foreign Application Priority Data
May 31, 2004    (KR) ............... 10-2004-0039339

(51) Int. Cl.
G02F 1/1343    (2006.01)
(52) U.S. Cl. .................................................. 349/141
(58) Field of Classification Search ............... 349/129, 349/130, 141
See application file for complete search history.

(56) References Cited
U.S. PATENT DOCUMENTS

| | | | | |
|---|---|---|---|---|
| 6,128,061 A | * | 10/2000 | Lee et al. ............ | 349/141 |
| 6,243,154 B1 | * | 6/2001 | You et al. ............ | 349/141 |
| 6,292,245 B1 | * | 9/2001 | Lee et al. ............ | 349/139 |
| 6,812,986 B2 | * | 11/2004 | Takatori et al. ...... | 349/141 |
| 7,268,847 B2 | * | 9/2007 | Hsieh et al. .......... | 349/139 |
| 2004/0066483 A1 | * | 4/2004 | Kim ..................... | 349/141 |
| 2005/0275783 A1 | * | 12/2005 | Lee et al. ............ | 349/141 |

FOREIGN PATENT DOCUMENTS

| | | |
|---|---|---|
| KR | 10-1999-0048947 | 7/1999 |
| KR | 100265572 | 6/2000 |
| KR | 100313946 | 10/2001 |
| KR | 1020020002669 | 1/2002 |

* cited by examiner

*Primary Examiner*—Andrew Schechter
*Assistant Examiner*—Matthew Tynan
(74) *Attorney, Agent, or Firm*—McKenna Long & Aldridge LLP (57) ABSTRACT

An in-plane switching liquid crystal display device includes first and second substrates, gate lines and data lines on the first substrate and intersecting each other, a plurality of unit pixels defined by the intersection of the gate and data lines, each unit pixel including a plurality of sub-pixel regions, at least one common electrode and at least one common electrode and at least one pixel electrode alternately arranged in each of the sub-pixel regions to define a first region, an in-plane electric field being generated in the first region, and at least one of the common electrode and the pixel electrode having a first closed-curved surface shape with a hollow center, and a liquid crystal layer between the first substrate and the second substrate.

18 Claims, 8 Drawing Sheets

○: VOLTAGE APPLIED
◐: VOLTAGE UNAPPLIED

FIG. 1
RELATED ART

◯ : VOLTAGE UNAPPLIED    ◯ : VOLTAGE APPLIED    ↕ :RUBBING DIRECTION

◎ : VOLTAGE APPLIED
◯ : VOLTAGE UNAPPLIED

FIG. 6

◐: VOLTAGE APPLIED
◯: VOLTAGE UNAPPLIED

IN-PLANE SWITCHING LIQUID CRYSTAL DISPLAY DEVICE HAVING CIRCULAR ELECTRODE

The present invention claims the benefit of Korean Patent Application No. 39339/2004 filed in Korea on May 31, 2004, which is hereby incorporated by reference.

BACKGROUND OF THE INVENTION

1. Field of the Invention

The present invention relates to a liquid crystal display device, and particularly, to an in-plane switching liquid crystal display device having circular electrodes that achieves a wide viewing angle in every direction and prevents a color shift.

2. Discussion of the Related Art

Because of the recent developments in various portable electronic devices, research is actively ongoing focusing on several types of flat panel display devices including liquid crystal display (LCD) devices, plasma display panel (PDP) devices, field emission display (FED) devices, and vacuum fluorescent display (VFD) devices. In particular, LCD devices have received much attention because they are light and thin, are simple to mass produce, produce high quality images, and have a low power consumption.

An LCD device includes a liquid crystal panel for displaying images and a driving element for supplying driving signals to the liquid crystal panel. In general, the liquid crystal panel includes first and second substrates and a liquid crystal layer formed by liquid crystal molecules injected between the first and second substrates.

There are various display modes of the LCD devices based on arrangements of liquid crystal molecules which are narrow and long. For example, a twisted nematic (TN) mode is commonly employed in LCD devices due to advantages, such as high contrast ratio, rapid response time and low driving voltage. However, the TN mode LCD device is disadvantageous in that a viewing angle for an observer is undesirably narrow because the liquid crystal molecules are aligned vertically by a vertical electric field. To solve such a narrow viewing angle problem, a new technology, such as an in-plane switching (IPS) mode LCD device, has been proposed. The IPS mode LCD device provides a wider viewing angle by aligning liquid crystal molecules horizontally by an in-plane electric field.

Figure 1:
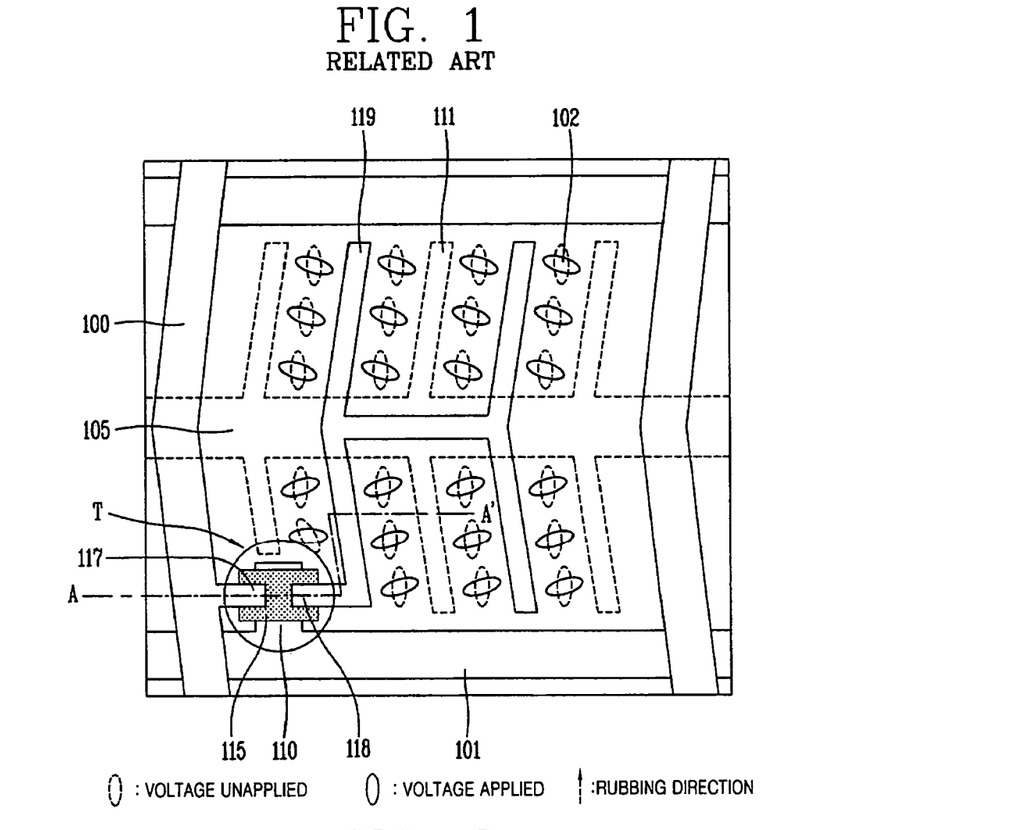
FIG. 1 is a plan view of a pixel region of an IPS LCD device according to the related art.
Figure 2:
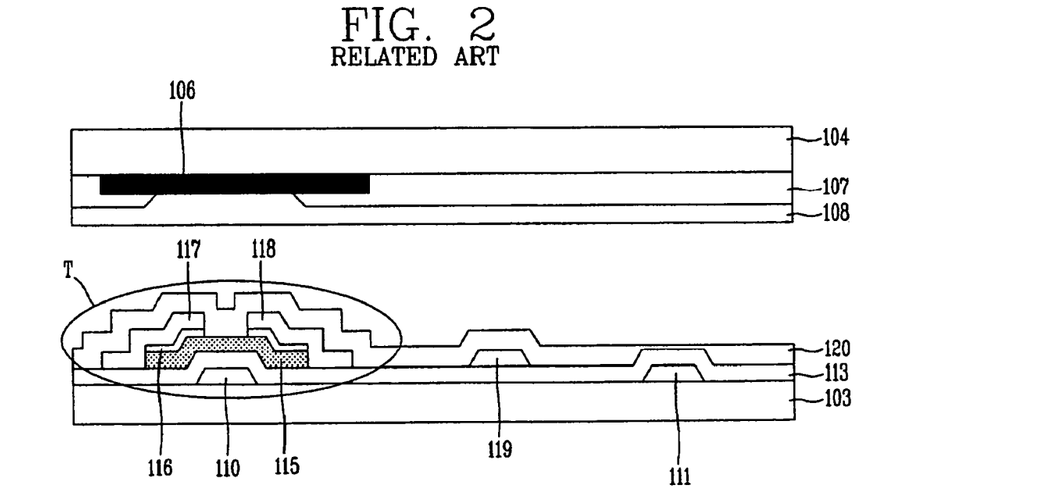
FIG. 2 is a cross-sectional view along A-A' of FIG. 1.

FIG. 1 is a plan view of a pixel region of an IPS LCD device according to the related art, and FIG. 2 is a cross-sectional view along A-A' of FIG. 1. In FIG. 1, an IPS LCD device includes data lines 100 and gate lines 101 crossing each other and defining pixel regions; a thin film transistor (TFT) T arranged at each intersection of the gate lines 101 and the data lines 100; and pixel electrodes 119 and common electrodes 111 arranged parallel to the data lines 100 in the pixel regions. Each TFT T includes a gate electrode 110 formed on the first substrate 103 and connected to the gate line 101; a gate insulation film 113 formed of a material such as SiNx or SiOx on the gate electrode 110; a semiconductor layer 115 formed on the gate insulation film 113; an ohmic contact layer 116 formed on the semiconductor layer 115; and a source electrode 117 and a drain electrode 118 formed on the ohmic contact layer 116 and respectively connected to the data line 100 and the pixel electrode 119. The common electrode 111 is connected to a common line 105, and the pixel electrode 119 is connected to the drain electrode 118 of the TFT T.

In addition, as shown in FIG. 2, the TFT T and the common electrode 111 within the pixel are formed on the first substrate 103, and the pixel electrode 119 is formed on the gate insulation film 113. A passivation film 120 formed of a material such as SiNx or SiOx is stacked on the TFT T, the pixel electrode 119 and the gate insulation film 113 over the entire surface, and a first alignment film (not shown) is applied thereon, thereby determining a direction that the liquid crystal molecules are aligned. The liquid crystal molecules 102 are aligned along a rubbing direction between the common electrode 111 and the pixel electrode 119 when a voltage is not applied to the electrodes.

Further, the IPS LCD includes a second substrate 104 corresponding to the first substrate 103. In particular, a black matrix 106 for preventing light leakage, a color filter layer 107 including R, G and B color filters, and an overcoat layer 108 are sequentially stacked on the second substrate 104.

Thus, the in-plane switching (IPS) LCD can be viewed from the front side at about 70° in the up/down and leftward/rightward directions. In particular, main viewing angle directions at different two domains formed by zigzag type electrodes are symmetrical, such that color shift is mutually compensated, not causing a color shift. Accordingly, the IPS LCD has a wider viewing angle than a TN mode LCD. However, when comparing with CRT display devices, the IPS LCD still has a narrower viewing angle and more problematic color shifts.

SUMMARY OF THE INVENTION

Accordingly, the present invention is directed to an in-plane switching liquid crystal display device that substantially obviates one or more of the problems due to limitations and disadvantages of the related art.

An object of the present invention is to provide an IPS LCD device for improving a viewing angle characteristic in every direction by forming at least one common electrode and at least one pixel electrode having a closed-curved surface shape to form an in-plane electric field in every direction along the shape of the closed curved surface shape.

Another object of the present invention is to provide an IPS LCD device capable of improving its aperture ratio and brightness by forming a liquid crystal driving region not only inside the common electrode and the pixel electrode but also at an outer edge portion of a pixel, and of maximizing efficiency of a liquid crystal driving mode by forming auxiliary electrodes of the common electrode and the pixel electrode on the region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching liquid crystal display device includes first and second substrates, gate lines and data lines on the first substrate and intersecting each other, a plurality of unit pixels defined by the intersection of the gate and data lines, each unit pixel including a plurality of sub-pixel regions, at least one common electrode and at least one pixel electrode alternately arranged in each of the sub-pixel regions to define a first region, an in-plane electric field being generated in the first region, and at least one of the common electrode and the pixel electrode having a first closed-curved surface shape with a hollow center, and a liquid crystal layer between the first substrate and the second substrate.

In another aspect, an in-plane switching liquid crystal display device includes first and second substrates, gate lines and data lines formed on the first substrate and intersecting each other, a plurality of unit pixels defined by the intersection of the gate and data lines, each unit pixel including at least one first sub-pixel region and at least one second sub-pixel region, the first sub-pixel region being immediately adjacent to the second sub-pixel region, an inner common electrode, a middle pixel electrode, and an outer common electrode alternatively arranged in the first sub-pixel region, the middle pixel electrode having a ring surface shape, an inner pixel electrode, a middle common electrode, and an outer pixel electrode alternatively arranged in the second sub-pixel region, the middle common electrode having a ring surface shape, and a liquid crystal layer formed between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
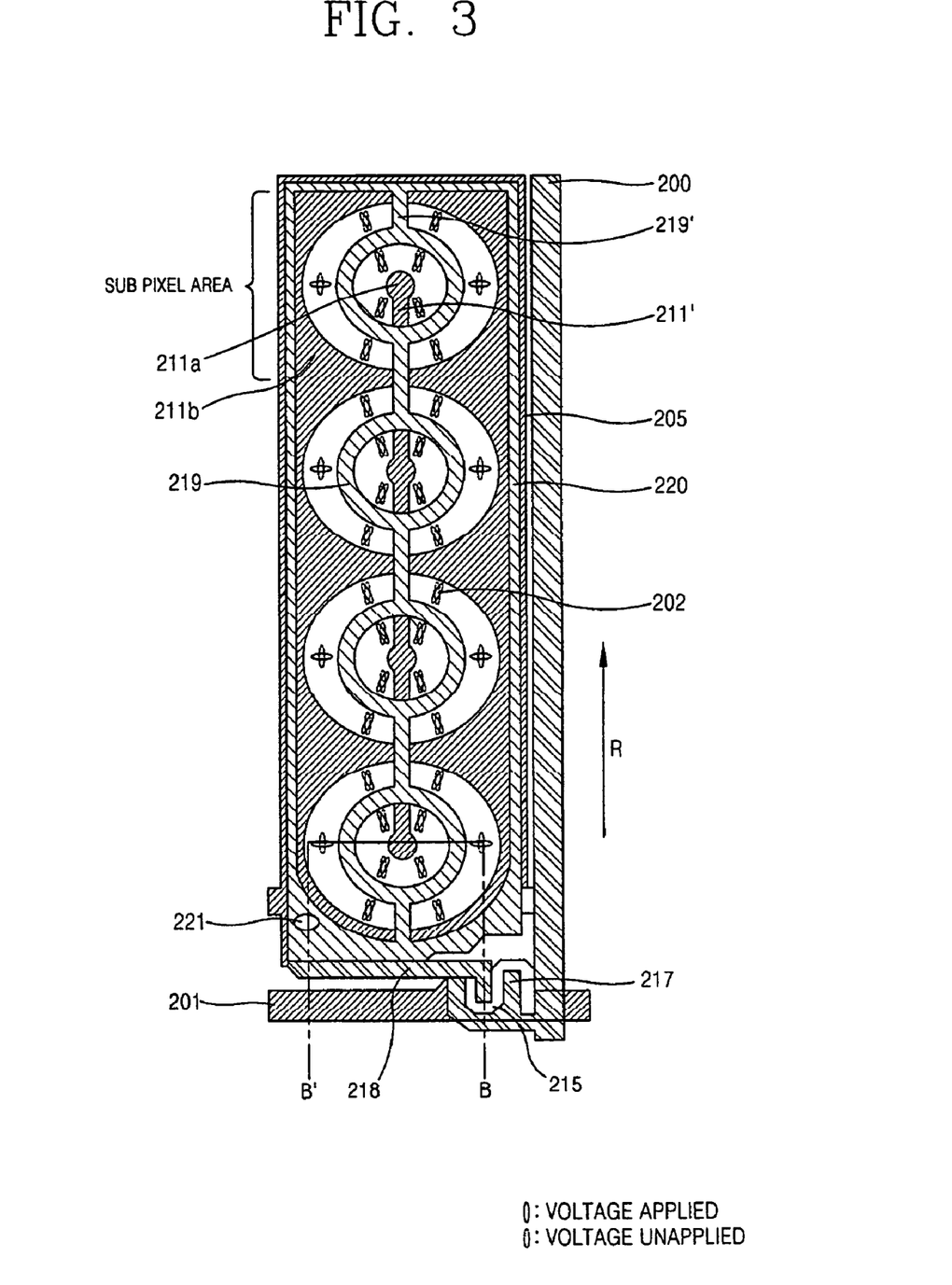
FIG. 3 is a view illustrating a pixel region an IPS LCD device in accordance with an embodiment of the present invention.

FIG. 3 is a view illustrating a pixel region of an IPS LCD device in accordance with an embodiment of the present invention. In FIG. 3, an IPS LCD device includes a data line 200 and a gate line 201 intersecting each other and defining a pixel region. In each pixel region, a source electrode 217 of a thin film transistor (TFT) formed of a metal layer overlaps the neighboring gate line 201, and a semiconductor layer 215 of the TFT is formed between the source electrode 217 and the gate line 201, namely a gate electrode (not shown). Also, a drain electrode 218 of the TFT is formed on the gate line 201, facing the source electrode 217.

In addition, the pixel region may include a plurality of sub-pixel areas. In each sub-pixel area, a first common electrode 211a, a second common electrode 211b and a pixel electrode 219 are formed to generate an in-plane electric field. In particular, the pixel electrode 219 may have a closed-curved surface shape with a hollow center, e.g., a loop shape, a ring shape, an elliptical outline or an egg outline, and may be formed spaced apart from the first and second common electrodes 211a and 211b. In particular, the pixel electrode 219 may be formed on a different layer from the first and second common electrodes 211a and 211b, but when viewed from a front side of the device, the pixel electrode 219 appears to be between the first and second common electrodes 211a and 211b with at a space therebetween.

Further, the first common electrode 211a may have a curved surface shape, e.g., a coin shape, at a center portion of the sub-pixel area. The second common electrode 211b may have a curvature opening corresponding to the shape of the pixel electrode 219. Thus, the second common electrode 211b may be an outermost common electrode within the sub-pixel area.

The first and second common electrodes 211a and 211b are electrically connected to each other and to other first and second common electrodes 211a and 211b in different sub-pixel areas through a common electrode connecting line 211'. The first common electrode 211a, the second common electrode 211b, and the common electrode connecting line 211' also are electrically connected to a common line 205. Further, the pixel electrode 219 is electrically connected to other pixel electrodes 219 in different sub-pixel areas through a pixel electrode connecting line 219', and the pixel electrode 219 and the pixel electrode connecting line 219' also are electrically connected to a pixel electrode line 220. In particular, the common electrode connecting line 211' and the pixel electrode connecting line 219' are formed parallel to the data line 200 and overlap each other at certain portions.

Figure 4:
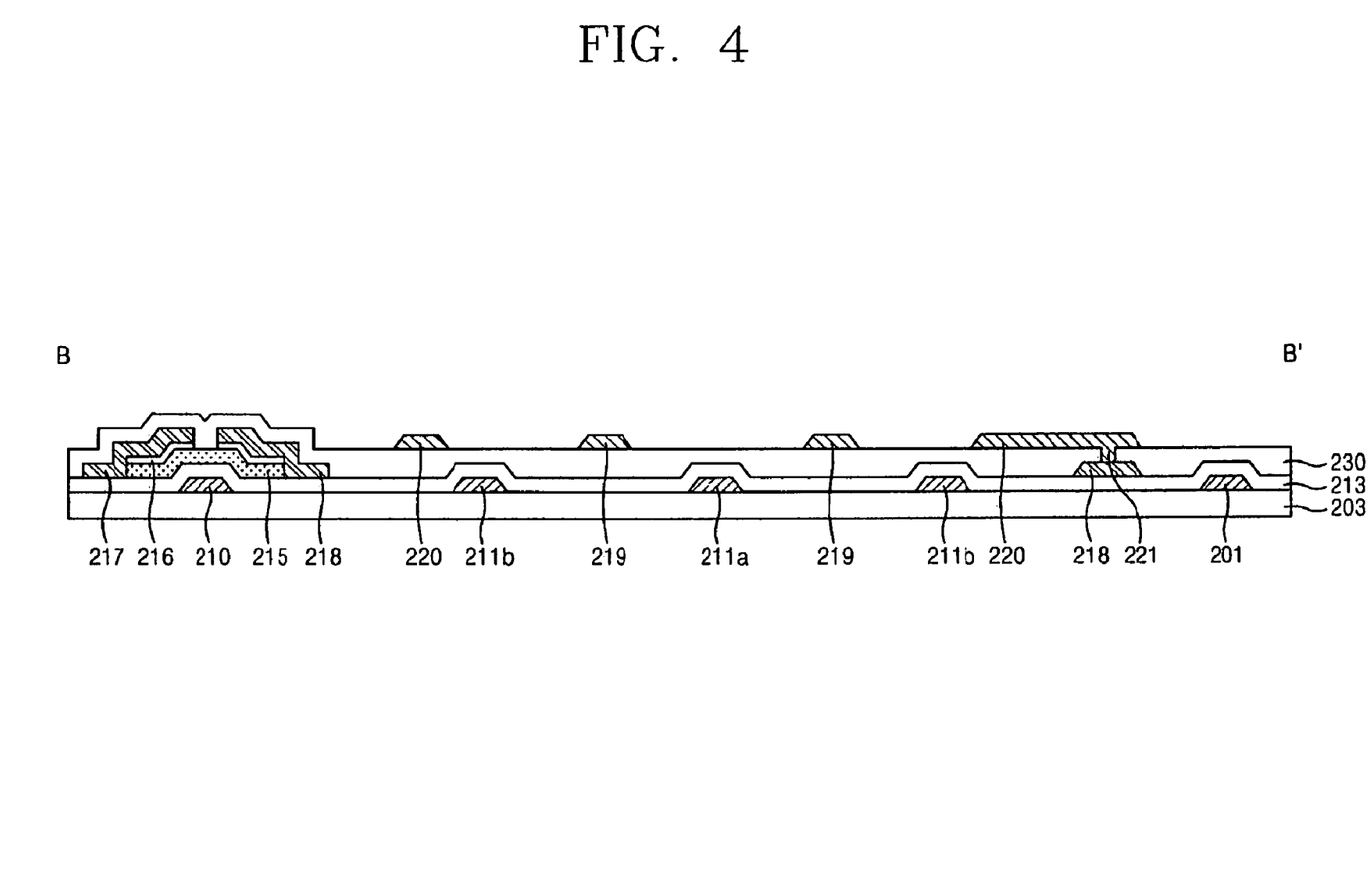
FIG. 4 is a cross-sectional view along B-B' of FIG. 3.

FIG. 4 is a cross-sectional view along B-B' of FIG. 3. As shown in FIG. 4, the pixel electrode 219 is between the first and second common electrodes 211a and 211b on a first substrate 203. The TFT, which may be a driving device of the LCD device, is also formed on the first substrate 203. The TFT includes a gate electrode 210, which may be a part of the gate line 201, a gate insulation film 213 on the gate electrode 210, the semiconductor layer 215 on the gate insulation film 213, an ohmic contact layer 216 on the semiconductor layer 215, and the source electrode 217 and the drain electrode 218 on the ohmic contact layer 216. The source electrode 217 is connected to the data line 200, and the drain electrode 218 is connected to the pixel electrode line 220 through a contact hole 221. Further, a passivation film 230 is formed over the entire surface of the first substrate 203 covering the TFT, the first common electrode 211a and the second common electrode 211b.

Thus, the first and second common electrodes 211a and 211b and the pixel electrodes 219 are alternately arranged, thereby generating an in-plane electrode inside the sub-pixel. Further, the pixel electrode line 220 and the common line 205 overlap each other with the gate insulation film 213 therebetween, thereby forming a storage capacity, e.g., a storage capacitor. In particular, the pixel electrode line 220 is connected to the pixel electrode 219, and the common line 205 is formed as part of an outermost electrode within the pixel region.

Accordingly, when a voltage is applied between the common electrodes 211a and 211b and the pixel electrode 219, an in-plane electric field is generated therebetween, thereby aligning the liquid crystal molecules 202 along a direction of the electric field. As shown in FIG. 3, when a voltage is not applied to the electrodes, the liquid crystal molecules 202 as illustrated with dotted outlines are aligned along a rubbing direction R, which may be parallel to the data line 200. However, when a voltage is applied to the electrodes, the liquid crystal molecules 202 as illustrated with solid outlines are aligned along the direction of the electric field.

As mentioned above, the two electrodes applying an in-plane electric field to the liquid crystal molecules 202 therebetween are formed in closed-curved surface shapes around a central electrode. Thus, the liquid crystal molecules 202 are arranged along the direction of the electric field and perpendicular to the electrodes at every location, thereby obtaining a wide viewing angle. As a result, the in-plane electric field formed between the pixel electrode 219 and the common electrodes 211a and 211b aligns the liquid crystal molecules 202 as shown in FIG. 3, thereby compensating for a color shift in a diagonal direction of each pixel region. Accordingly, a color inversion which happens in an IPS LCD device according to the related art is prevented within a viewing angle of about ±45°.

However, the IPS LCD device shown in FIG. 3 has less desirable characteristics in that its aperture ratio and brightness are not maximized due to an area occupied by the outermost opaque common electrode 211b within the sub-pixel. Further, a light blocking region of a rough triangle shape is formed by the pixel electrode line 220 and surfaces having a curvature of the outermost common electrodes 211b.

Figure 5:
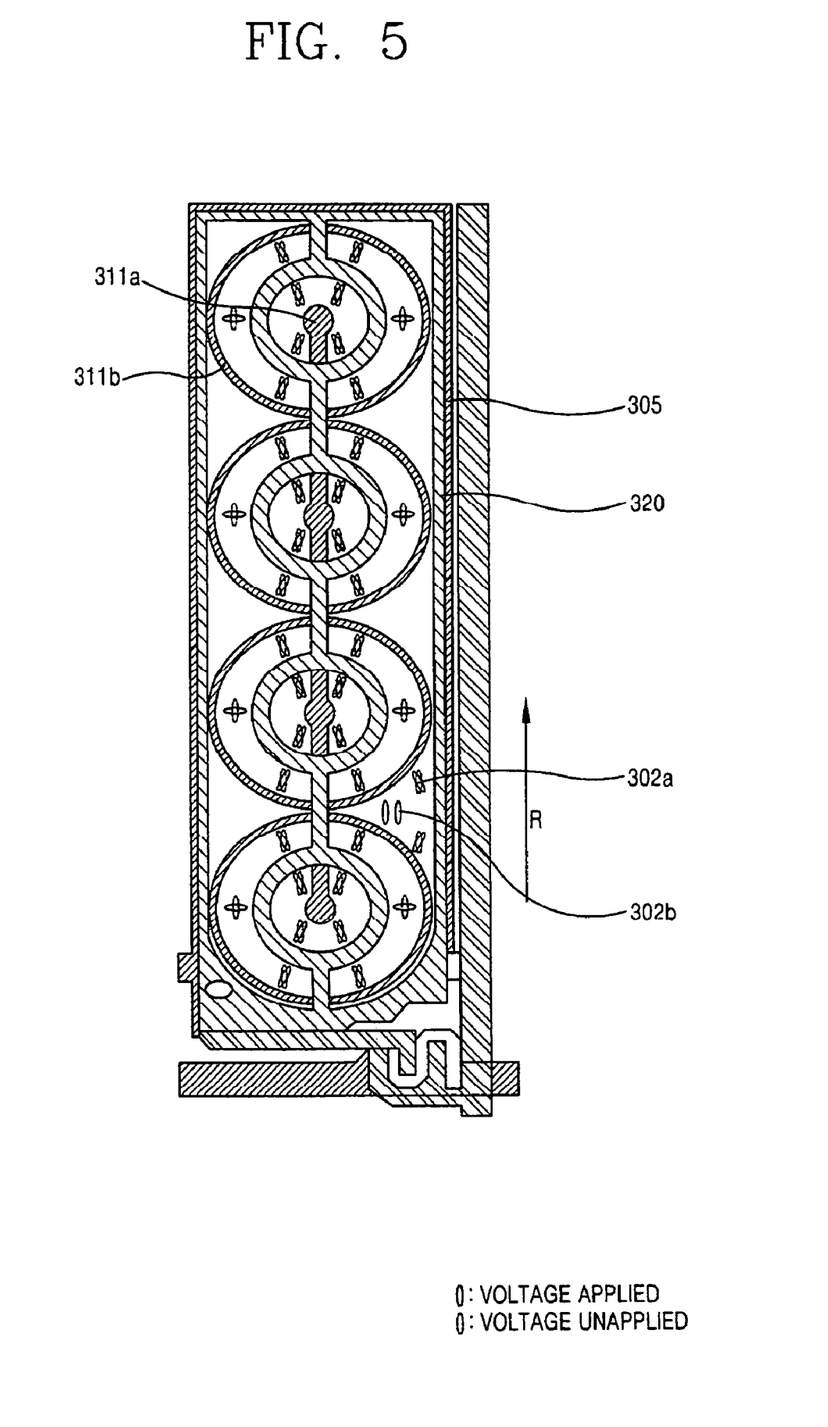
FIG. 5 is a view illustrating an IPS mode LCD device in accordance with another embodiment of the present invention.

FIG. 5 is a view illustrating an IPS mode LCD device in accordance with another embodiment of the present invention. In FIG. 5, an IPS LCD device includes a data line and a gate line intersecting each other and defining a pixel region. Each pixel region includes a thin film transistor (TFT) having a gate electrode, a semiconductor layer, a source electrode and a drain electrode. The gate electrode is connected to the gate line, and the source electrode is connected to the data line.

In addition, the pixel region may include a plurality of sub-pixel areas. In each sub-pixel area, a first common electrode 311a, a second common electrode 311b and a pixel electrode are formed to generate an in-plane electric field. In particular, the pixel electrode may have a closed-curved surface shape with a hollow center, e.g., a loop shape, a ring shape, an elliptical outline or an egg outline, and may be formed spaced apart from the first and second common electrodes 311a and 311b.

Further, the first common electrode 311a may have a curved surface shape, e.g., a coin shape, at a center portion of the sub-pixel area. The second common electrode 311b may have a closed-curved surface shape corresponding to the shape of the pixel electrode. Thus, the second common electrode 211b may be an outermost common electrode within the sub-pixel area, and no triangular light-blocking region is formed. Specifically, a metal layer is patterned in a step of forming the first and second common electrodes 311a and 311b to additionally form a light transmitting region having a rough triangle shape between the common electrode 311b and a common electrode line 305. As a result, the light transmitting region is a second region in which an additional in-plane electric field is generated.

Accordingly, when a voltage is applied to the common electrode 311b and the pixel electrode line 320, an in-plane electric field is generated in the added light transmitting region. For example, when a voltage is not applied to the electrodes, the liquid crystal molecules 302a as illustrated with dotted outlines are aligned along a rubbing direction R. The rubbing direction R may be parallel to the pixel electrode line 320. Further, when a voltage is applied to the electrodes, the liquid crystal molecules 302a as illustrated with solid outlines are aligned along the direction of the electric field. Thus, liquid crystal molecules 302a as illustrated with solid outlines are aligned along a direction of the electric field between the common electrode 311b and the pixel electrode line 320, thereby improving an aperture ratio and a brightness.

Although not shown in the drawing, as a different structure of the present invention, a pixel electrode having a loop shape may be formed as an outermost electrode in every sub-pixel. Thus, the common line is immediately adjacent to the outermost pixel electrode instead of the pixel electrode line.

Figure 9:
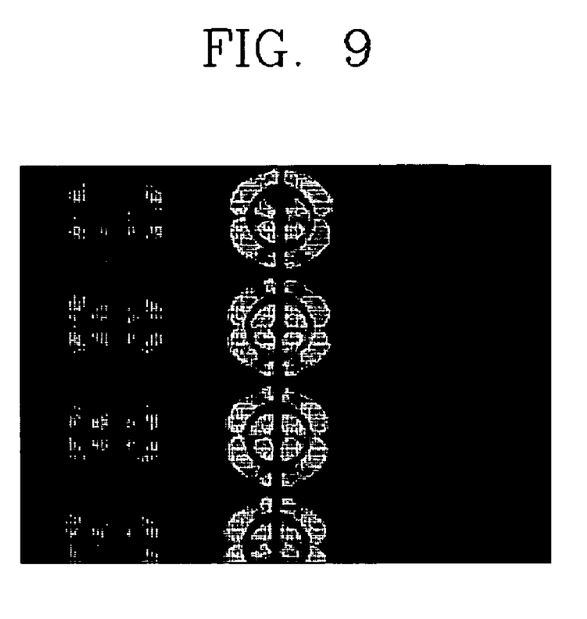
FIG. 9 is an image showing a brightness of the IPS LCD device shown in FIG. 3.
Figure 10:
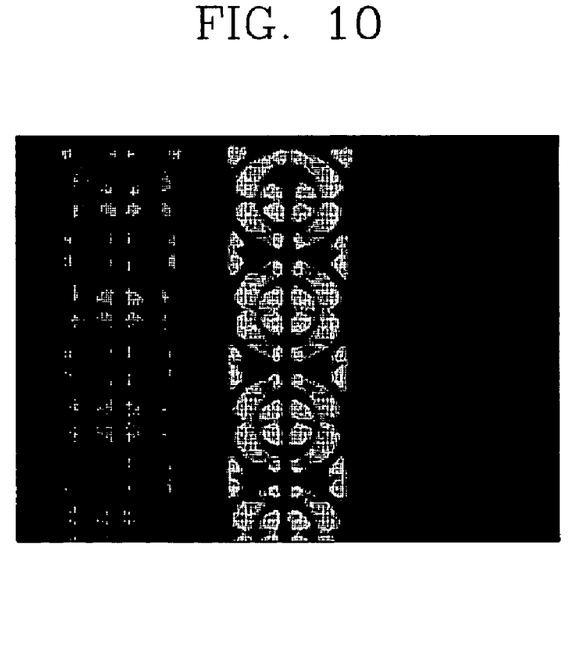
FIG. 10 is an image showing a brightness of the IPS LCD device shown in FIG. 5.

FIG. 9 is an image showing a brightness of the IPS LCD device shown in FIG. 3, and FIG. 10 is an image showing a brightness of the IPS LCD device shown in FIG. 5. As shown in FIGS. 9 and 10, for example, an aperture ratio of the IPS LCD device shown in FIG. 3 is about 35%, and an aperture ratio of the IPS LCD device shown in FIG. 5 is about 45%. Thus, the aperture ratio is improve by about 10% in the IPS LCD device shown in FIG. 5 by providing an additional light transmitting region between the outermost common electrode and the pixel electrode line. Also, a brightness measurement test on IPS LCD devices, having backlight of 7800 nit, transmittance of color filter of 26%, and transmittance of polarization plate of 38%, showed that a brightness of an IPS LCD device having the structure shown in FIG. 5 increases by 40 nit with respect to 300 nit which was a brightness of the related art IPS LCD device.

However, outermost common electrodes 311b of two sub-pixels that vertically meet at one corner of the light transmitting region face each other at an acute angle, thereby causing an inversion of alignment of the liquid crystal molecules 302b. Thus, the IPS LCD device shown in FIG. 5 has limited efficiency of a liquid crystal driving mode.

Figure 6:
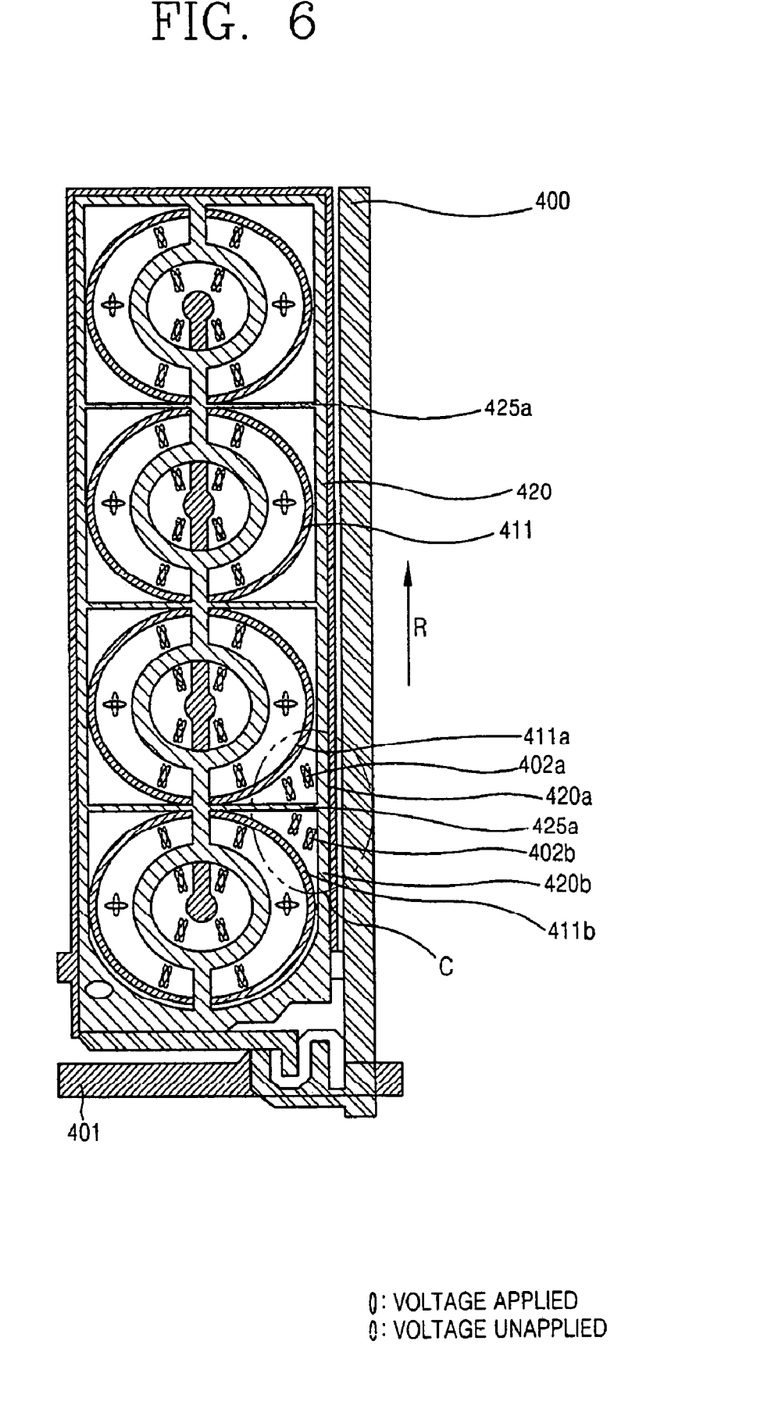
FIG. 6 is a view illustrating an IPS LCD device in accordance with yet another embodiment of the present invention.

FIG. 6 is a view illustrating an IPS LCD device in accordance with yet another embodiment of the present invention. In FIG. 6, an IPS LCD device includes a data line 400 and a gate line 401 intersecting each other and defining a pixel region. Each pixel region includes a thin film transistor (TFT) having a gate electrode, a semiconductor layer, a source electrode and a drain electrode. The gate electrode is connected to the gate line 401, and the source electrode is connected to the data line 400.

In addition, the pixel region may include a plurality of sub-pixel areas. In addition, a first auxiliary electrode 425a may divide the pixel region into the plurality of sub-pixel areas. For example, the first auxiliary electrode 425a may be a boundary between two vertically-neighboring sub-pixel areas, and the first auxiliary electrode 425a may be parallel to the gate line 401 and perpendicular to the data line 400. Thus, when viewed from the front side of the device, the first auxiliary electrode 425a is formed in the second region of a rough triangle shape, and linearly protrudes from a pixel electrode line 420. The first auxiliary electrode 425a may have a polarity opposite to that of an outermost common electrode 411 of each sub-pixel area.

For example, in a marked area C, an in-plane electric field in a direction of ($\sim$) is generated at an upper region formed by the outermost common electrode 411a of an upper sub-pixel of two neighboring sub-pixel areas, the first auxiliary electrode 425a meeting the common electrode 411a at an angle of about 45°, and the pixel electrode line 420a. Accordingly, liquid crystal molecules 402a are aligned along a direction of the electric field, thereby forming one domain in the upper region. Likewise, the other liquid crystal domain is formed as liquid crystal molecules 402b are aligned in a direction of (╱) at a lower region formed by the outermost common electrode 411b of a lower sub-pixel, the first auxiliary electrode 425a facing the common electrode 411b at an angle of about 45°, and the pixel electrode line 420b. In particular, the two domains are symmetrical along a direction parallel to the gate line 401, and this phenomenon happens over the entire LCD device, thereby improving the efficiency of the liquid crystal driving mode.

Moreover, when rubbing is made along a direction parallel to the gate line 401, the liquid crystal molecules may be aligned in a crosswise direction. For example, in the area C, the liquid crystal molecules, which are crosswise aligned parallel to the gate line when a voltage is not applied to the electrode, are realigned at angles of ±45° along (╲) and (╱) or (╲) and (╱) directions of the electric field when the voltage is applied the electrode, thereby enabling screen display. In particular, since the liquid crystal molecules are crosswise aligned when a voltage is not applied to the electrode, distortion of alignment of the liquid crystal molecules due to residual voltage between the outermost common electrode 411 and the pixel electrode line 420 is not created. Accordingly, defects, such as leakage of light, are not created even in a black and white mode.

Figure 7:
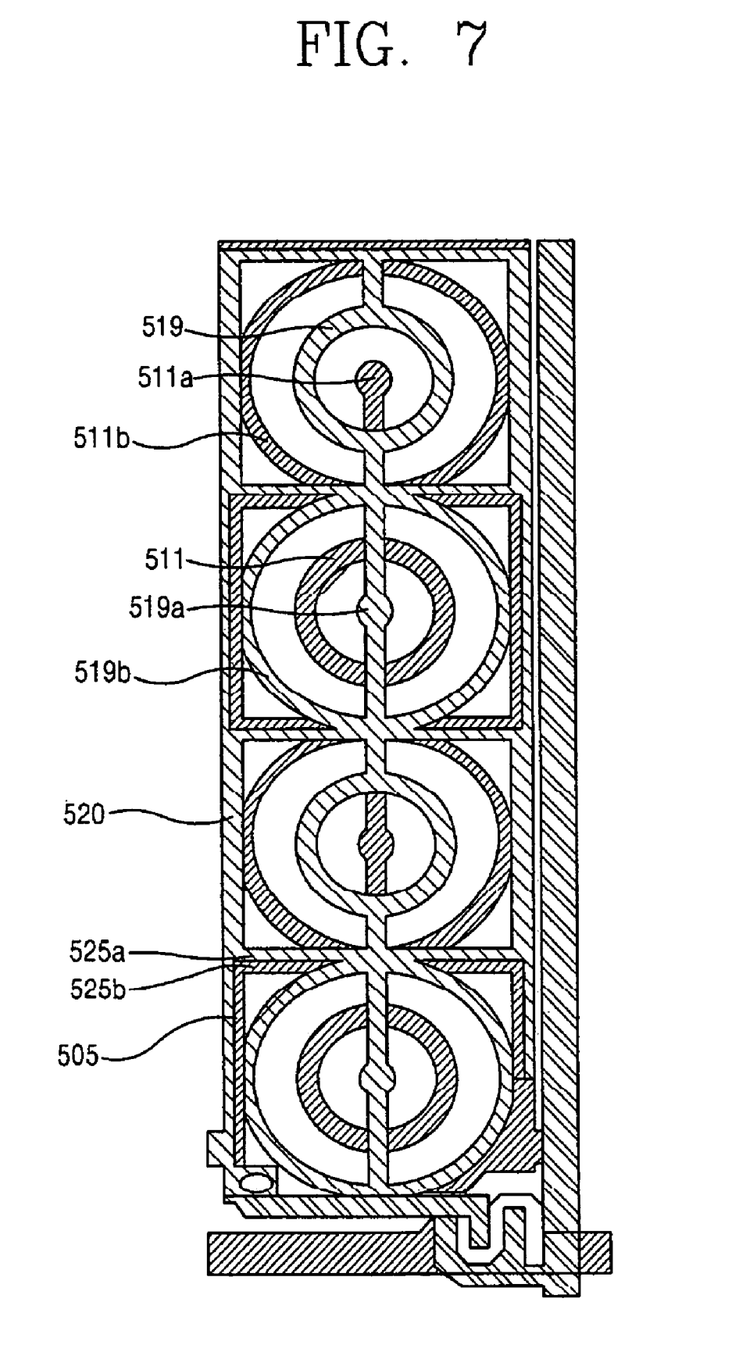
FIG. 7 is a view illustrating an IPS LCD device in accordance with an embodiment of the present invention.

FIG. 7 is a view illustrating an IPS LCD device in accordance with an embodiment of the present invention. In FIG. 7, an IPS LCD device includes a data line and a gate line intersecting each other and defining a pixel region. Each pixel region includes a thin film transistor (TFT) having a gate electrode, a semiconductor layer, a source electrode and a drain electrode. The gate electrode is connected to the gate line, and the source electrode is connected to the data line.

In addition, the pixel region may include a plurality of sub-pixel areas. In particular, an outer common electrode 511b and an outer pixel electrode 519b are alternately arranged as outermost electrodes of neighboring sub-pixel areas. In the sub-pixel area having the outer common electrode 511b as the outermost electrode, a middle pixel electrode 519 and an inner common electrode 511a also may be formed. For example, the outer common electrode 511b may have a closed-curved surface shape with a hollow center, e.g., a loop shape, a ring shape, an elliptical outline or an egg outline, and the middle pixel electrode 519 may have a closed-curved surface shape corresponding to the shape of the outer common electrode 511b. Further, the inner common electrode 511a may have a curved surface shape, e.g., a coin shape, at a center portion of the sub-pixel area.

Further, the neighboring sub-pixel area may have the outer pixel electrode 519b as the outermost electrode, and also may have a middle common electrode 511 and an inner pixel electrode 519a. The outer pixel electrode 519b may have a closed-curved surface shape with a hollow center, e.g., a loop shape, a ring shape, an elliptical outline or an egg outline, that is substantially the same as the outer common electrode 511b. In addition, the middle common electrode 511 may have a closed-curved surface shape corresponding to the shape of the outer pixel electrode 519b, and the inner pixel electrode 519a may have a curved surface shape, e.g., a coin shape, at a center portion of this sub-pixel area. These two neighboring sub-pixel areas may be arranged next to each other vertically or horizontally of the device.

Thus, the two neighboring sub-pixels respectively have a structure of inner common electrode 511a—middle pixel electrode 519—outer common electrode 511b, and a structure of inner pixel electrode 519a—middle common electrode 511—outer pixel electrode 519b. Further, the outer common electrode 511b, the middle common electrode 511 and the inner common electrode 511a may be electrically connected to each other and to a common line 505. Similarly, the outer pixel electrode 519b, the middle pixel electrode 519 and the inner pixel electrode 519a may be electrically connected to each other and to a pixel electrode line 520. Accordingly, outermost electrodes within neighboring sub-pixels have opposite polarities.

Furthermore, the pixel electrode line 520 is formed around a sub-pixel area having the outer common electrode 511b as its outermost electrode. In particular, the pixel electrode line 520 has a polarity opposite to that of the outermost common electrode 511b and faces the outermost common electrode 511b within the sub-pixel area, thereby generating an in-plane electric field. Further, a common line 505 is formed around a sub-pixel area having the outer pixel electrode 519b as its outermost electrode. In particular, the common line 505 has a polarity opposite to that of the outer pixel electrode 519b and faces the outer pixel electrode 519b within the sub-pixel area. Thus, the pixel electrode lines 520 and the common lines 505 are alternately disposed as outer edge portions of neighboring sub-pixel areas, thereby improving the efficiency of the liquid crystal driving mode.

Moreover, a second auxiliary electrode 525b, which may be part of the common line 505, is installed adjacent to the first auxiliary electrode 525a, which may be part of the pixel electrode line 520. In particular, the first auxiliary electrode 525a and the second auxiliary electrode 525b may protrude respectively from the pixel electrode line 520 and common line 505. Although not shown, additional middle pixel electrodes and middle common electrodes may be alternatively formed within each sub-pixel region.

Figure 8:
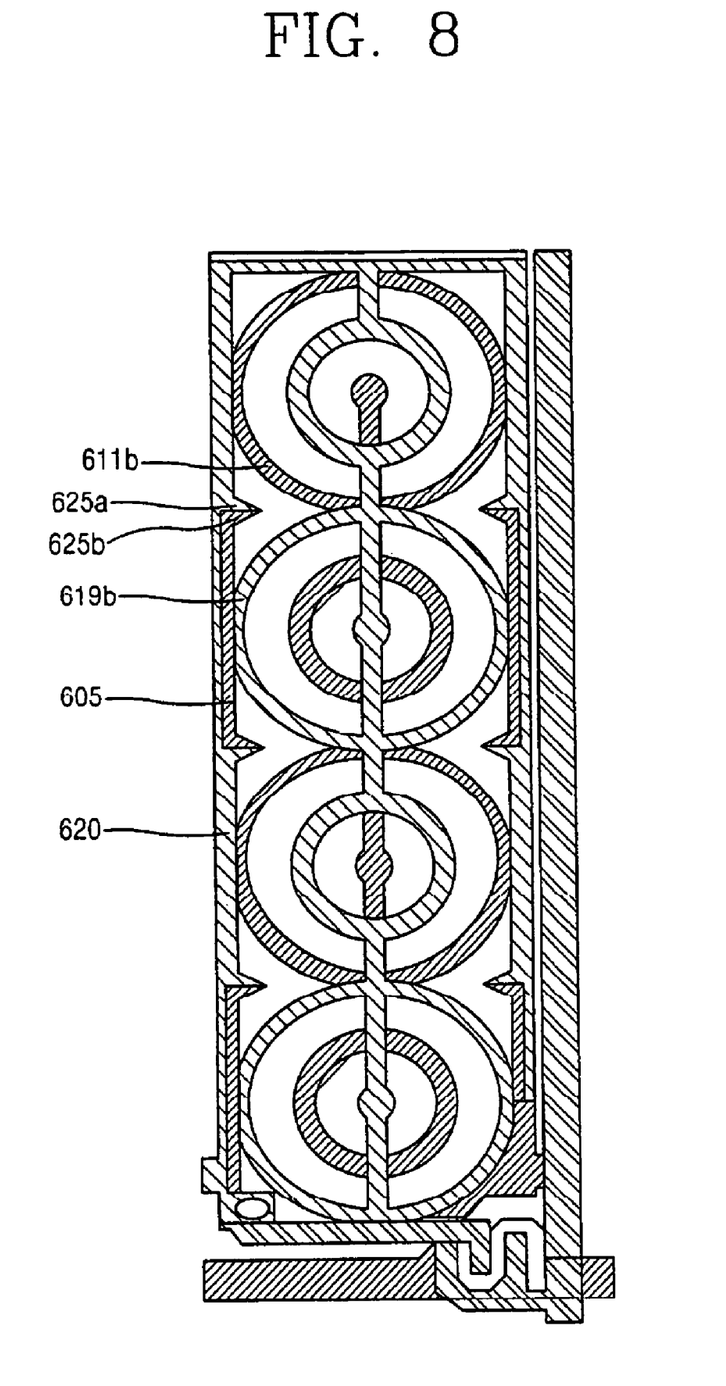
FIG. 8 is a view illustrating an IPS LCD device in accordance with another embodiment of the present invention.

FIG. 8 is a view illustrating an IPS LCD device in accordance with another embodiment of the present invention. In FIG. 8, an IPS LCD device includes a data line and a gate line intersecting each other and defining a pixel region. Each pixel region includes a thin film transistor (TFT) having a gate electrode, a semiconductor layer, a source electrode and a drain electrode. The gate electrode is connected to the gate line, and the source electrode is connected to the data line.

In addition, the pixel region may include a plurality of sub-pixel areas. In addition, triangular third and fourth auxiliary electrodes 625a and 625b may be formed at boundaries of the plurality of sub-pixel areas. For example, when viewed from the front side of the device, the third auxiliary electrode 625a appears to be a right triangle linearly protruded from a pixel electrode line 620 in an upper sub-pixel area, and the fourth auxiliary electrode 625b appears to be a right triangle linearly protruded from a common line 605 in a lower sub-pixel area immediately adjacent to the third auxiliary electrode 625a. The third auxiliary electrode 625a may have a polarity opposite to the fourth auxiliary electrode 625b and that of an outermost common electrode 611b of each sub-pixel area. The fourth auxiliary electrode 625b may have a polarity opposite to that of an outermost pixel electrode 619b of each sub-pixel area.

Because the third auxiliary electrode 625a and the fourth auxiliary electrode 625b occupy a smaller area within a pixel than an area occupied by the first and second auxiliary electrodes 525a and 525b (shown in FIG. 7), a transmittance of the IPS LCD device shown in FIG. 8 is further improved. In addition, the pixel electrode line 620 and the common line 605, intervals between the outermost common electrode 611b and the third auxiliary electrode 625a and between the outermost pixel electrode 619b and the fourth auxiliary electrode 625b are substantially uniformly maintained, thereby increasing the efficiency of the liquid crystal driving mode at an outer edge portion of each sub-pixel region.

Further, in-plane electric fields are generated between the outermost common electrode 611*b* and the third auxiliary electrode 625*a* and between the outermost pixel electrode 619*b* and the fourth auxiliary electrode 625*b*, thereby allowing liquid crystal molecules to be aligned at angles of about ±45°. Accordingly, the liquid crystal molecules may be aligned crosswise, thereby preventing cross talk and flicker. Although not shown, additional middle pixel electrodes and middle common electrodes may be alternatively formed within each sub-pixel region.

Accordingly, a pixel of an IPS LCD device according to an embodiment of the present invention includes an outer electrode having a closed-curved surface shape having a hollow center and an inner electrode have a curved surface shape corresponding to the outer electrode. Thus, an in-plane electric field is formed in every direction along the shape of the closed curved surface shape, thereby compensating for a color shift and improving a viewing angle.

Further, a pixel of an IPS LCD device according to an embodiment of the present invention may further include an outermost electrode having a closed-curved surface shape corresponding to the outer electrode. Thus, an additional light transmitting region maybe formed between the outermost and outer electrodes, and an additional in-plane electrical field may be formed between the outermost and outer electrodes, thereby further improving an aperture ratio and a brightness.

Furthermore, a pixel of an IPS LCD device according to an embodiment of the present invention may have neighboring sub-pixel areas that are divided by an auxiliary electrode and/or have outermost electrodes with opposite polarities and/or outer edges lines with opposite polarities, thereby improving the efficiency of the liquid crystal driving mode and maximizing the light efficiency of the IPS LCD device.

It will be apparent to those skilled in the art that various modifications and variations can be made in the in-plane switching liquid crystal display device having circular electrodes of the present invention without departing from the spirit or scope of the invention. Thus, it is intended that the present invention covers the modifications and variations of this invention provided they come within the scope of the appended claims and their equivalents.

What is claimed is:

1. An in-plane switching liquid crystal display device comprising:
    first and second substrates;
    gate lines and data lines on the first substrate and intersecting each other;
    a plurality of unit pixels defined by the intersection of the gate and data lines, each unit pixel including a plurality of sub-pixel regions;
    a first common electrode, second common electrode and a pixel electrode in each sub-pixel region to generate an in-plane electric field,
    wherein the pixel electrode has a first closed-curved surface shape with a hollow center and is located between the first and second common electrodes with a space therebetween;
    and the first common electrode has a second closed-curved surface shape at a center portion of the sub-pixel region, and the second common electrode has a curvature opening corresponding to the shape of the pixel electrode as an outermost common electrode within the sub-pixel region and a third closed-curved surface shape;
    a pixel electrode line connected to the pixel electrode and having a fourth closed-curved surface shape; and
    a liquid crystal layer between the first substrate and the second substrate.

2. The device of claim 1, wherein the second common electrode has a curvature opening corresponding to the first closed-curved surface shape, the second common electrode is immediately adjacent to the at least one of the common electrode and the pixel electrode having the first closed-curved surface shape, and a second in-plane electric field is generated between the second common electrode and the at least one of the common electrode and the pixel electrode.

3. The device of claim 1, wherein the second common electrode has the third closed-curved surface shape with a hollow center.

4. The device of claim 3, wherein the third closed-curved surface shape is larger than the first closed-curved surface shape and has similar curved outline as the first closed-curved surface shape.

5. The device of claim 3, wherein the pixel electrode line is formed along an outer edge portion of the unit pixel, and a third in-plane electric field is generated between the pixel electrode line and the second common electrode.

6. The device of claim 1, further comprising:
    a common line along the outer edge portion of the unit pixel, the common line being electrically connected to the first common electrode and the second common electrode.

7. The device of claim 6, wherein the pixel electrode line overlaps a portion of the common line and forms a storage capacity therebetween.

8. The device of claim 3, further comprising:
    a first auxiliary electrode along a boundary between two vertical sub-pixel regions.

9. The device of claim 6, wherein the pixel electrode is immediately adjacent to the second common electrode of a first sub-pixel region, and the common line is immediately adjacent to the second common electrode of a second sub-pixel region, the second sub-pixel region being immediately adjacent to the first sub-pixel region vertically or horizontally.

10. The device of claim 3, further comprising:
    a triangular auxiliary electrode at a boundary between two vertical sub-pixel regions.

11. An in-plane switching liquid crystal display device comprising:
    first and second substrates;
    gate lines and data lines on the first substrate and intersecting each other;
    a plurality of unit pixels defined by the intersection of the gate and data lines, each unit pixel including at least one first sub-pixel region and at least one second sub-pixel region, the first sub-pixel region being immediately adjacent to the second sub-pixel region;
    an inner common electrode, a middle pixel electrode, and an outer common electrode alternatedly arranged in the first sub-pixel region, the inner common electrode having a first curved surface shape and the middle pixel electrode having a ring surface shape;
    an inner pixel electrode, a middle common electrode, and an outer pixel electrode alternatively arranged in the second sub-pixel region, the inner pixel electrode having a second curved surface shape and the middle common electrode having a ring surface shape;
    at least one pair of common line and pixel electrode line along an outer edge portion of the unit pixel, wherein the common line is immediately adjacent to the outer pixel electrode in the second sub-pixel region, and the pixel electrode line is immediately adjacent to the outer common electrode in the first sub-pixel region; and a liquid crystal layer between the first substrate and the second substrate.

12. The device of claim 11, wherein the outer common electrode and the outer pixel electrode have a ring surface shape.

13. The device of claim 11, further comprising:
at least one first auxiliary electrode linearly arranged along a boundary between the first and second sub-pixel regions.

14. The device of claim 11, further comprising:
at least one first auxiliary electrode linearly arranged along a boundary between the first and second sub-pixel regions, the first auxiliary electrode being electrically connected to the pixel electrode line.

15. The device of claim 11, further comprising:
in the first sub-pixel region, a first auxiliary electrode linearly arranged along a boundary between the first and second sub-pixel regions, the first auxiliary electrode being electrically connected to the pixel electrode line; and
in the second sub-pixel region, a second auxiliary electrode linearly arranged along the boundary between the first and second sub-pixel regions, the second auxiliary electrode being electrically connected to the common line.

16. The device of claim 11, further comprising:
at least one third auxiliary electrode having a triangular shape and arranged at a boundary between the first and second sub-pixel regions, the third auxiliary electrode being electrically connected to the pixel electrode line.

17. The device of claim 11, further comprising:
at least one fourth auxiliary electrode having a triangular shape and arranged at a boundary between the first and second sub-pixel regions, the fourth auxiliary electrode being electrically connected to the common line.

18. The device of claim 11, wherein the inner pixel electrode, the middle pixel electrode and the outer pixel electrode are electrically connected to each other, and the inner common electrode, the middle common electrode and the outer common electrode are electrically connected to each other.

* * * * *